US010017083B2

(12) United States Patent
Jo et al.

(10) Patent No.: US 10,017,083 B2
(45) Date of Patent: Jul. 10, 2018

(54) VEHICLE FURNITURE

(71) Applicant: Ford Global Technologies, LLC, Dearborn, MI (US)

(72) Inventors: Eunhee Jo, London (GB); Sam James, St. Albans (GB); Marcus Hoggarth, Hertfordshire (GB)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/398,995

(22) Filed: Jan. 5, 2017

(65) Prior Publication Data

US 2017/0190273 A1 Jul. 6, 2017

(30) Foreign Application Priority Data

Jan. 6, 2016 (GB) .................................. 1600182.8

(51) Int. Cl.
| *A47C 7/72* | (2006.01) |
| *A47C 31/00* | (2006.01) |
| *B60N 2/68* | (2006.01) |
| *B60N 2/02* | (2006.01) |
| *B60N 2/22* | (2006.01) |
| *B60N 2/56* | (2006.01) |

(Continued)

(52) U.S. Cl.
CPC ............ *B60N 2/68* (2013.01); *B60N 2/0292* (2013.01); *B60N 2/22* (2013.01); *B60N 2/5685* (2013.01); *B60N 2/70* (2013.01); *H05B 1/0238* (2013.01); *H05B 3/54* (2013.01); *H05B 2203/029* (2013.01)

(58) Field of Classification Search
CPC .......... B60N 2/68; B60N 2/0292; B60N 2/22; B60N 2/5685; B60N 2/70; B60N 2/56; B60N 2/5607; B60N 2/5678; H05B 1/0238; H05B 3/54; H05B 2203/029
USPC .............................. 297/180.1, 180.11, 180.12
See application file for complete search history.

(56) References Cited

U.S. PATENT DOCUMENTS

| 5,700,337 A | 12/1997 | Jacobs et al. |
| 5,934,609 A | 8/1999 | Kuklinski |

(Continued)

FOREIGN PATENT DOCUMENTS

| EP | 2177717 A1 | 4/2010 |
| WO | 2016057853 A1 | 4/2016 |

OTHER PUBLICATIONS

Gerard Ward, Oct. 14, 2014, "MIT lab develops programmable shape-shifting carbon fibre", Wired.co.uk, [online], available from: http://www.wired.co.uk/article/skylar-tibbits-exclusive-interview [accessed:Jun. 14, 2016].

*Primary Examiner* — Mark R Wendell
(74) *Attorney, Agent, or Firm* — Vichit Chea; Price Heneveld LLP

(57) ABSTRACT

An article of vehicle furniture includes one or more adaptive support elements. Each of the adaptive support elements includes a carbon fiber layer operable between support and configurable conditions and a heating element in thermal communication with the carbon fiber layer. The heating element is configured to heat the carbon fiber layer from the support condition to the configurable condition. Each of the adaptive support elements further includes a thermal barrier layer, wherein the heating element is disposed between the thermal barrier layer and the carbon fiber layer.

18 Claims, 3 Drawing Sheets

(51) Int. Cl.
*B60N 2/70* (2006.01)
*H05B 1/02* (2006.01)
*H05B 3/54* (2006.01)

(56) References Cited

U.S. PATENT DOCUMENTS

| | | |
|---|---|---|
| 2005/0218710 A1 | 10/2005 | Browne et al. |
| 2007/0056957 A1* | 3/2007 | Diemer ............... B60N 2/5685 219/549 |
| 2007/0135878 A1* | 6/2007 | Lachenbruch ......... A61G 7/057 607/108 |
| 2007/0246285 A1 | 10/2007 | Browne et al. |
| 2009/0051196 A1* | 2/2009 | Ishii ...................... H05B 3/146 297/180.12 |
| 2010/0326976 A1* | 12/2010 | Nakajima ............. A47C 7/748 219/217 |
| 2012/0169094 A1* | 7/2012 | Bajic ...................... A47C 7/72 297/180.12 |
| 2014/0159450 A1* | 6/2014 | Guering ................ A47C 7/405 297/284.3 |
| 2015/0274051 A1* | 10/2015 | Mueller .................. B60N 2/68 296/68.1 |
| 2016/0052432 A1* | 2/2016 | Lafferty ............... B60N 2/5685 297/180.12 |

* cited by examiner

VEHICLE FURNITURE

CROSS-REFERENCE TO RELATED APPLICATION

This application claims priority to GB 1600182.8, filed on Jan. 6, 2016, the entire contents of which are hereby incorporated herein by reference.

FIELD OF THE INVENTION

This disclosure relates to a vehicle interior arrangement assembly having one or more adaptive elements, and in particular, but not exclusively, relates to a vehicle seat having an adaptive support element configured to change in shape.

BACKGROUND OF THE INVENTION

A vehicle interior arrangement assembly, for example a seat, a bed or a table, can be configured in a large number of ways according to the desired purpose and category of the vehicle. For example, the vehicle may be a luxury vehicle where spacious and comfortable vehicle furniture configurations are desirable. In another example, where the vehicle is a family vehicle, it is desirable to be able to re-configure the vehicle furniture to accommodate a different number of people or provide different load space configurations depending on the desired use of the vehicle.

It is difficult therefore to configure a vehicle interior to meet the needs of an entire spectrum of individuals that may use a single vehicle. For example, where the vehicle is a communal vehicle, such as a hire car, a first individual who uses the vehicle may wish to configure the vehicle for maximum comfort, whereas a second individual may wish to maximize the number of occupants that are able to be seated in the vehicle. As a result, an automotive manufacturer may have to provide a larger number of vehicles and/or seating configurations in order to meet the market requirements. Even within similar vehicle categories, it is desirable to configure the vehicle interior to suit the physical characteristics of a large number of individuals. For example, the ability to change a position of a vehicle seat to suit a range of differently sized individuals is a desirable feature.

Furthermore, especially with the advent of semi- and fully-autonomous vehicles, it is desirable to be able to change the layout of the vehicle interior, for example during a journey, to suit the requirements of the individuals using the vehicle on that journey.

SUMMARY OF THE INVENTION

According to one arrangement of the present disclosure there is provided an article of vehicle furniture having one or more adaptive elements each comprising: a carbon fiber layer; and at least one first heating element configured to heat the carbon fiber layer in one or more regions to cause the adaptive element to change shape. This change in shape may, for example, comprise a change in curvature of all or part of the adaptive element.

In the context of the present disclosure, the term "vehicle furniture" is understood to mean any appropriate furniture that can be used to make the interior and/or exterior of the vehicle suitable for being occupied/used by one or more individuals. The vehicle furniture may, for example, be a seat, a bench, a headrest, an armrest, a footrest, a bed, a table, and/or a desk. The adaptive element may be an adaptive support element configured to support a part of the body of a user of the vehicle, or an article carried in or on the vehicle.

The article of vehicle furniture may comprise at least two adaptive elements arranged adjacent to one another. The article of vehicle furniture may comprise at least two elements spaced apart from each another.

The adaptive element may be elongate. For example, the adaptive element may comprise a discrete strip. A plurality of these strips may be connected together to form a portion of an article of vehicle furniture. For example, a plurality of the strips may be connected together to form a seat base, a seat back, a bed, a footrest, a headrest, an armrest and/or a table.

The adaptive element may comprise a body portion having a longitudinal axis. The adaptive element may be configured to change in shape along the longitudinal axis of the body portion.

The article of vehicle furniture may have a first adaptive element configured to change in shape by a first amount. The article of vehicle furniture may have a second adaptive element configured to change in shape by a second amount. The shapes of the first adaptive element and the second adaptive element may define an overall shape of the article of vehicle furniture, for example the shape may comprise a curvature with at least a component in a direction perpendicular to the longitudinal axis of the body portion.

The article of vehicle furniture comprises one or more intermediate elements. The intermediate element may be provided next to at least one adaptive element and/or in between a plurality of adaptive elements. The adaptive elements and the intermediate elements may be arranged in an alternating manner. The intermediate elements are configured to follow the shape of the adaptive elements. The intermediate elements may be passive, for example the intermediate elements may be configured to follow the shape of the adaptive elements simply by virtue of being coupled to adaptive elements.

The adaptive element may have a dimension in the range of approximately 20 to 100 mm in a direction perpendicular to the longitudinal axis of the body portion. The adaptive element may have a dimension of 60 mm in a direction perpendicular to the longitudinal axis of the body portion.

The adaptive element may be provided in a lumbar region of a vehicular seat. The adaptive element may be configured to change the radius of curvature of the lumbar region within a range of approximately 180 to 300 mm.

The adaptive element may extend at least partially across the article of vehicle furniture, i.e. laterally. The adaptive element may extend at least partially along the article of vehicle furniture, i.e. longitudinally.

The adaptive element may comprise a thermal barrier configured to reduce the transfer of thermal energy, for example from the first heating element to the environment surrounding the adaptive element and/or from the environment surrounding the adaptive element to the carbon fiber layer.

The thermal barrier may be provided in between the carbon fiber layer and an individual using the furniture. The thermal barrier may be configured to reduce the transfer of thermal energy from the first heating element to the individual. The thermal barrier may be configured to reduce the transfer of thermal energy from the individual to the carbon fiber layer.

The adaptive element may comprise a second heating element configured to heat the article of vehicle furniture, for example a supporting surface of the adaptive element.

The second heating element may be a heating element of a heated seat. The thermal barrier may be configured to reduce the transfer of thermal energy from the second heating element to the carbon fiber layer. The thermal barrier may comprise a radiant barrier. The radiant barrier may be configured to reflect the thermal energy of the first heating element towards the carbon fiber layer. The thermal barrier may comprise a heat barrier, which reduces the transfer of heat between the first heating element and a supporting surface of the adaptive element. The thermal barrier may comprise a surface coating, for example a thermal barrier coating, applied to the carbon fiber layer.

The adaptive element may comprise a position sensor configured to detect the shape of the carbon fiber layer. The adaptive element may comprise a pressure sensor configured to detect the pressure distribution along the adaptive element. The adaptive element may comprise a temperature sensor configured to detect the temperature of the adaptive element, for example a support surface and/or an occupant-contacting surface of the adaptive element.

The article of vehicle furniture may comprise a controller configured to adjust the shape of the carbon fiber layer, for example the controller may be configured to adjust the input to the first heating element to control the shape of the carbon fiber layer. The controller may be configured to receive one or more signals from at least one of the pressure sensor, the temperature sensor and the position sensor. The controller may be configured to adjust the shape of the carbon fiber layer in response to a signal from at least one of the position sensor, the pressure sensor and the temperature sensor.

According to another arrangement, there is provided a vehicle comprising at least one of the above mentioned adaptive elements.

According to another arrangement, there is provided a vehicle comprising at least one of the above mentioned articles of vehicle furniture.

According to another arrangement, there is provided a method of adapting the shape of an article of vehicle furniture, the article of vehicle furniture having one or more adaptive elements each comprising: a carbon fiber layer; and at least one heating element configured to heat the carbon fiber layer in one or more regions, the method comprising: heating the carbon fiber layer to cause the adaptive elements to change shape and cause the one or more intermediate elements to follow the shape of the one or more adaptive elements. This change in shape may, for example, comprise a change in curvature of all or part of the adaptive element.

The method may comprise determining the pressure distribution applied to the adaptive element using one or more pressure sensors. The method may comprise changing the shape of the adaptive element in response to the pressure distribution.

The method may comprise determining the temperature distribution along the adaptive element using one or more temperature sensors. The method may comprise changing the shape of the adaptive element in response to the temperature distribution.

According to another arrangement of the present disclosure there is provided an adaptive element comprising: a carbon fiber layer; a heating element configured to heat the carbon fiber layer in one or more regions to cause the adaptive element to change in shape; and a thermal barrier configured to mitigate the transfer of thermal energy from at least one of: the first heating element to the environment surrounding the adaptive element; and the environment surrounding the adaptive element to the carbon fiber layer. This change in shape may, for example, comprise a change in curvature of all or part of the adaptive element.

The thermal barrier may be applied directly to one or more surfaces of the carbon fiber layer. For example, the thermal barrier may comprise a sheet of material bonded to a surface portion of the carbon fiber layer. The thermal barrier may be provided in between the first heating element and the environment surrounding the adaptive element.

The thermal barrier may be configured to reflect the thermal energy of the heating element towards the carbon fiber layer. For example, where the heating element is provided in between the carbon fiber layer and the thermal barrier, the thermal barrier may be configured to redirect any thermal energy that would have otherwise been transferred to the environment back towards the carbon fiber layer. In this manner, the efficiency of the adaptive element may be increased.

The adaptive element may comprise a second heating element spaced apart from the first heating element. The second heating element may be configured to provide thermal energy to one or more portions of the adaptive element other than the carbon fiber element. The intended function of the first and second heating elements may be mutually exclusive. The thermal barrier may be configured to reflect thermal energy, for example from the second heating element, away from the carbon fiber layer.

The thermal barrier may comprise a radiant barrier. The thermal barrier may comprise a conductive barrier. The thermal barrier may comprise a convective barrier. The thermal barrier may comprises a surface coating applied to at least a portion of the adaptive element. For example, the thermal barrier may be applied to at least one of the carbon fiber layer, the first heating element and the second heating element.

According to another arrangement of the present disclosure there is provided an article of vehicle furniture having one or more adaptive elements each comprising: a carbon fiber layer; and at least one first heating element configured to heat the carbon fiber layer in one or more regions to cause the adaptive element to change shape. This change in shape may, for example, comprise a change in curvature of all or part of the adaptive element.

In the context of the present disclosure, the term "carbon fiber" is used to mean carbon fiber-reinforced polymer, i.e. a composite material having carbon fiber strands bound in a thermoset resin, such as epoxy.

To avoid unnecessary duplication of effort and repetition of text in the specification, certain features are described in relation to only one or several aspects or arrangements of the disclosure. However, it is to be understood that, where it is technically possible, features described in relation to any aspect or arrangement of the disclosure may also be used with any other aspect or arrangement of the disclosure.

These and other aspects, objects, and features of the present invention will be understood and appreciated by those skilled in the art upon studying the following specification, claims, and appended drawings.

BRIEF DESCRIPTION OF THE DRAWINGS

For a better understanding of the present disclosure, and to show more clearly how it may be carried into effect, reference will now be made, by way of example, to the accompanying drawings, in which.

DETAILED DESCRIPTION OF THE PREFERRED EMBODIMENTS

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 1A:
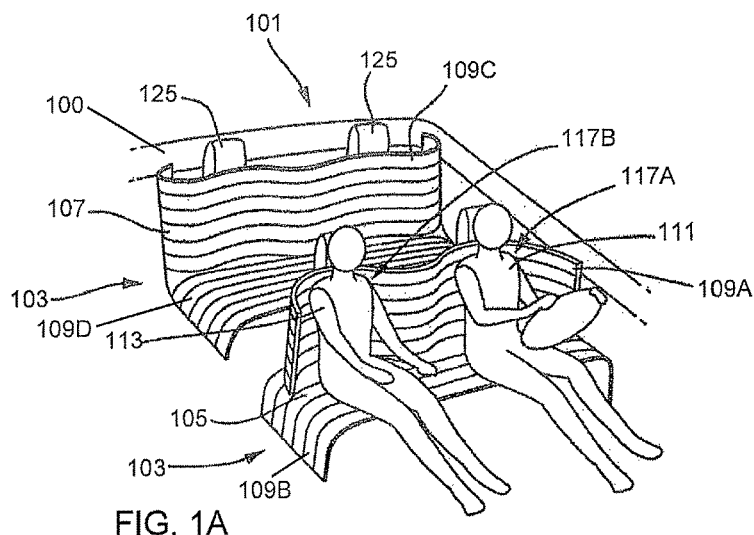
FIGS. 1A to 1C each show an article of vehicle furniture having an adaptive support element.
Figure 1B:
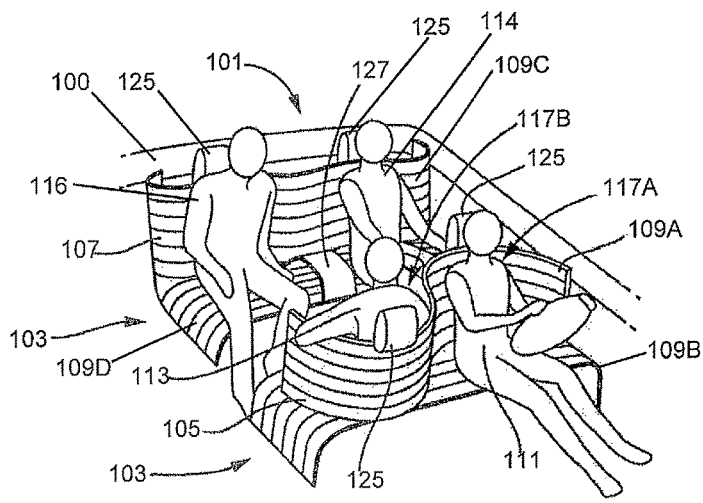
Figure 1C:
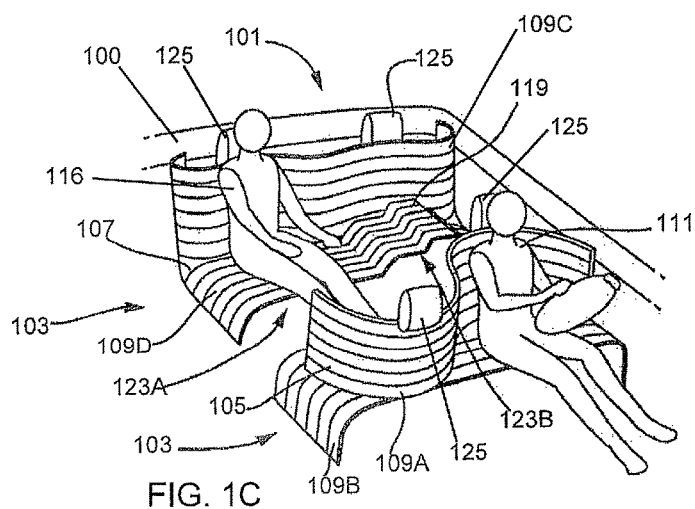

FIGS. 1A to 1C each show the interior 101 of a vehicle 100 that is provided with articles of vehicle furniture 103. In the arrangements shown in FIGS. 1A to 1C, the vehicle 100 is a car having the vehicle furniture 103 arranged as a front seat 105 and a rear seat 107. However, the vehicle 100 may be any appropriate type of vehicle, such as a van, a truck, a lorry, a motorcycle, an aircraft, or a water-borne vehicle. The vehicle furniture 103 may be any appropriate type of furniture and may be configured to be installed to the interior 101 of the vehicle 100. For example, the articles of vehicle furniture 103 may be any appropriate articles that can be used to make the interior 101 of the vehicle 100 suitable for being occupied by one or more individuals, such as seats, headrests, armrests, footrests, tables, and/or desks. Additionally or alternatively, the vehicle furniture 103 may be installed to the exterior of the vehicle 100, for example the vehicle furniture 103 may include a motorcycle seat, or a bench seat installed on the deck of a vessel.

FIGS. 1A to 1C show three different configurations of the vehicle furniture 103 comprising a plurality of adaptive elements 109 (FIG. 2) in the form of adaptive support elements 109A, 109B and 109C, 109D for forming front and rear vehicle seats 105, 107. It is understood, however, that the present disclosure is not limited to those configurations shown in FIGS. 1A to 1C and that the articles of vehicle furniture 103 may be configured in any appropriate manner according to the configuration of the vehicle 100 to which the vehicle furniture 103 is installed. As found in FIGS. 1A to 1C, the adaptive elements 109A, 109B and 109C and 109D are modified to provide various configurations for the vehicle interior 101. As such, it is contemplated that FIGS. 1A to 1C each show the same adaptive support elements 109A, 109B and 109C and 109D in various configurations for personalizing the vehicle interior 101.

FIG. 1A shows a first configuration of the vehicle furniture 103 in which the front seat 105 is configured to seat two occupants, for example a driver 111 and a front passenger 113, in a forward-facing position. The rear seat 107 is configured in a similar manner to the front seat 105, such that any rear passengers that occupy the rear seat 107 are also in a forward-facing position.

FIG. 1B shows an arrangement in which the vehicle furniture 103 has adapted from the first configuration shown in FIG. 1A to a second configuration. In FIG. 1B, the front seat 105 is configured to seat a first occupant, for example the driver 111, in a forward-facing position, and a second occupant, for example the front passenger 113, in a rear-facing position. The rear seat 107 of FIG. 1B is configured in a similar manner to the rear seat 107 of FIG. 1A, such that rear passengers 114, 116 are in forward-facing positions on rear seat 107. In this manner, the front passenger 113 in the rear-facing portion of the front seat 105 is able to sit facing the rear passengers 114, 116 seated in the rear seat 107.

A change between the first configuration of FIG. 1A and the second configuration of FIG. 1B is brought about by a change in curvature of the adaptive support element 109A that forms an upper portion, for example a back support portion, of the front seat 105. In the arrangement shown in FIG. 1A, the adaptive support element 109A has a curvature that provides two discrete recessed portions 117A, 117B of the upper portion, that are configured to provide a seating location for the driver 111 and the front passenger 113, respectively. In the arrangement shown in FIG. 1B, the adaptive support element 109A has changed in curvature, such that the configuration of the recessed portion 117B has changed to seat the front passenger 113 in the opposite direction relative to that shown in FIG. 1A. In other words, the adaptive support element 109A has changed in curvature to redefine how the interior 101 of the vehicle 100 may be used. In doing so, the orientation of the passenger seat 117B of the front seat 105 has changed from a forward-facing position (FIG. 1A) to a rear-facing position (FIG. 1B).

FIG. 1C shows an arrangement in which the vehicle furniture 103 has adapted from the second configuration shown in FIG. 1B to a third configuration. In FIG. 1C, the front seat 105 is configured to seat a first occupant, for example the driver 111, in a forward-facing position, and a second occupant, for example the front passenger 113 (not shown), in a rear-facing position. The rear seat 107 is configured to seat a rear passenger 116 in a position facing the front passenger 113 in the front seat 105, and to provide a supporting surface, for example a table 119, next to the rear passenger 116 on which items may be placed. However, it is understood that the configuration of the vehicle furniture 103 may change in any appropriate sequence and/or by any appropriate amount from those arrangements shown in FIGS. 1A to 1C. For example, the vehicle furniture 103 may change directly between the configuration shown in FIG. 1A and the configuration shown in FIG. 1C, and/or between one or more further arrangements depending upon the desired use of the vehicle interior.

A change between the second configuration of FIG. 1B and the third configuration of FIG. 1C is brought about by a change in curvature of the adaptive support element 109D that forms a lower portion, for example a seat portion, of the rear seat 107. In the arrangement shown in FIG. 1B, the adaptive support element 109D has a curvature that provides two discrete recessed portions that are each configured to provide a seating location for rear passengers 114, 116. In the arrangement shown in FIG. 1C, the adaptive support element 109D of the lower portion has changed in curvature, such that the curvature of one of the recessed portions is now disposed in an opposite direction to that shown in FIG. 1B. In other words, the adaptive support element 109D has changed in curvature from a form that provides two recessed seat portions, to a form that provides a single recessed portion 123A configured to seat rear passenger 116, and a projected portion 123B configured to provide a supporting surface, which in the case of FIG. 1C is a table 119.

Figure 2:
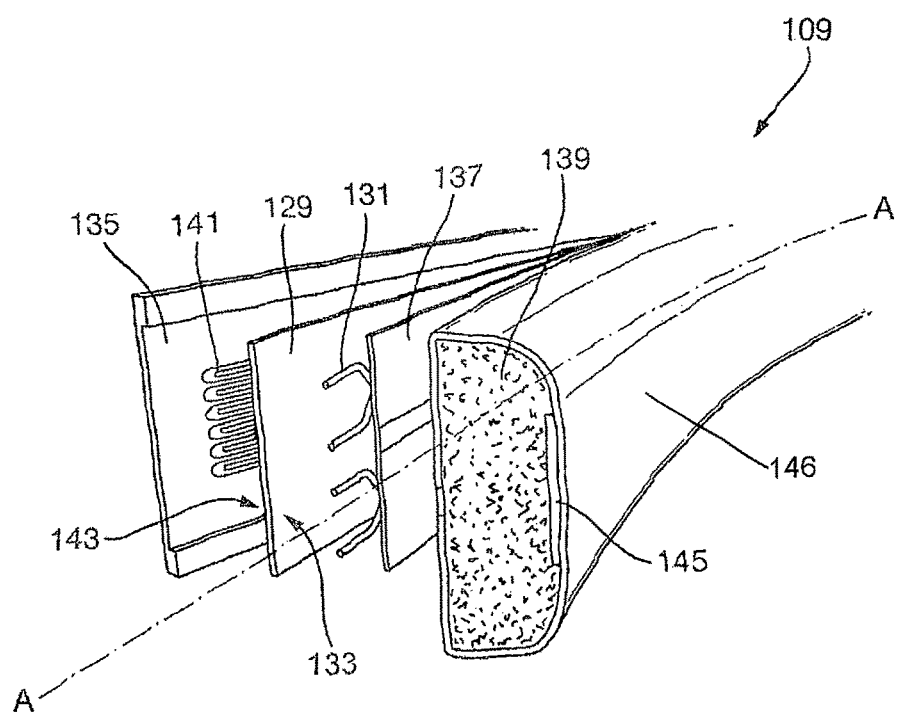
FIG. 2 shows an exploded view of the adaptive support element.
Figure 3:
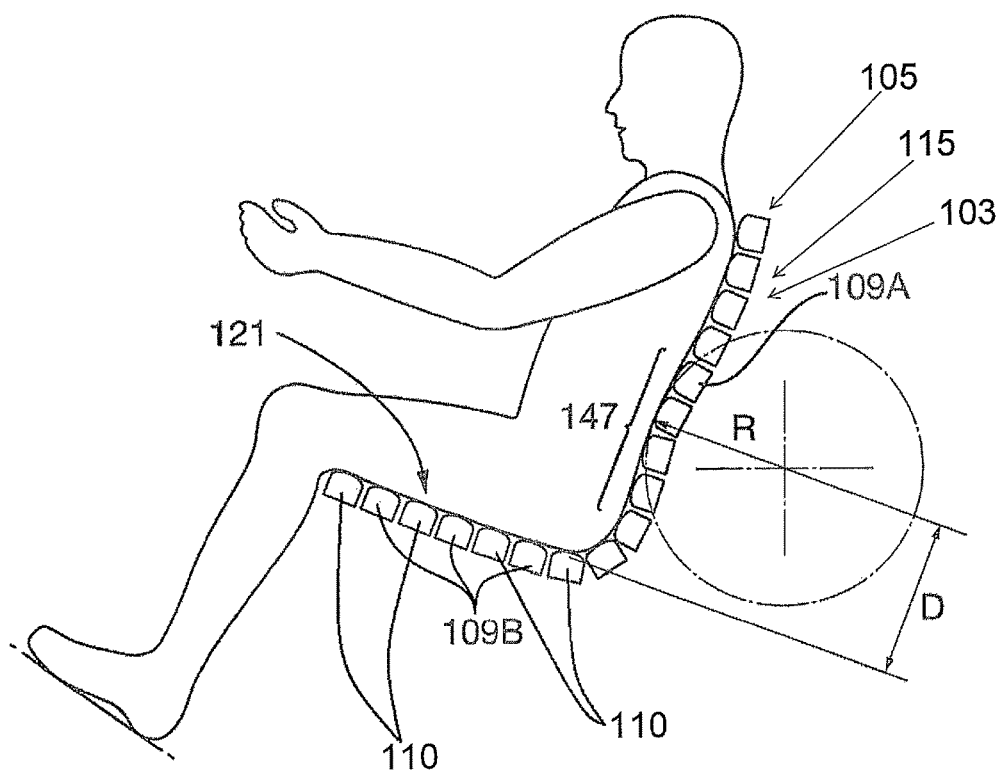
FIG. 3 shows the article of vehicle furniture having adapted to the shape of a vehicle driver's spine.

While not shown in FIGS. 1A to 1C, it is understood that the lower portion of the front seat 105 may comprise one or more of the adaptive support elements 109B. Similarly, the upper portion of the rear seat 107 may comprise one or more of the adaptive support elements 109C. Indeed, any appropriate portion of the vehicle furniture 103 may comprise one or more of the adaptive support elements 109 (FIG. 2). For example, a headrest 125 attached to the upper portions of the front and rear seats 105, 107 and/or an armrest 127 may comprise one or more of the adaptive support elements 109. Further, it is contemplated that any one of the articles of vehicle furniture 103 may include one or more adaptive support elements 109 along with one or more intermediate members. The intermediate members are contemplated to be disposed between adaptive support elements 109 and are generally passive or follower elements which follow the contours of the adaptive support elements 109 to provide the various configurations shown in FIGS. 1A to 1C. Specific intermediate elements 110 are shown in the embodiment of FIG. 3 disposed between adaptive support elements 109A and 109B.

The adaptive support elements 109A, 109B and 109C, 109D are shown in linear strips in FIGS. 1A to 1C, but may assume other configurations. The adaptive support elements 109A, 109B and 109C, 109D may include adaptive support elements 109 that are disposed adjacent to one another, or the adaptive support elements 109 may be spaced-apart with intermediate elements disposed therebetween. Further, the adaptive support elements 109 may be disposed in an alternating pattern with the intermediate elements 110, as further described below with reference to FIG. 3.

In order to effect the change in configuration of the vehicle furniture 103, an exemplary embodiment of an adaptive support element 109 is shown in FIG. 2 comprising a carbon fiber layer 129 and a first heating element 131. The first heating element 131 is in thermal communication with the carbon fiber layer 129 and is configured to heat the carbon fiber layer 129 in one or more regions to cause the adaptive support element 109 to become malleable and therefore susceptible to a change in curvature or configuration. For example, the heating element 131 may be provided in one or more discrete regions on and/or in the carbon fiber layer 129, such that the heating element 131 is able to apply thermal energy to the carbon fiber layer 129. In this manner, discrete regions of the carbon fiber layer 129 may be heated to cause the carbon fiber layer 129 to become malleable susceptible to bending in those regions to which thermal energy is applied from the first heating element 131. In this way, the carbon fiber layer 129 is operable between support and configurable conditions. Specifically, the carbon fiber layer 129 is heated from the support condition to the configurable condition by the heating element 131. The carbon fiber layer 129 is then cooled from the configurable condition to the support condition when the heating element is deactivated and the carbon fiber layer 129 is allowed to cool. The carbon fiber layer 129 is contemplated to reassume a rigid support configuration in the cooled state.

As shown in FIG. 2, the adaptive support element 109 may be a laminate structure comprising at least the carbon fiber layer 129 and the first heating element 131. In this arrangement, the carbon fiber layer 129 is an elongate strip and the first heating element 131 is positioned against a front face 133 of the carbon fiber layer 129. The carbon fiber layer 129 may however have any appropriate configuration and the first heating element 131 may be positioned against one or more appropriate faces of the carbon fiber layer 129.

The adaptive support element 109 may comprise at least one further layer and/or further components depending on its intended use. For example, where the adaptive support element 109 forms a portion of a seat, the adaptive support element 109 may have a padding layer to increase the comfort of the seat. Additionally or alternatively, where the adaptive support element 109 is configured for outdoor use, the adaptive support element 109 may have a protective layer configured to protect the adaptive support element 109 against exposure to the environment.

In the exemplary embodiment shown in FIG. 2, the adaptive support element 109 comprises a backing layer 135, a thermal barrier 137 and a padding layer 139. The backing layer 135 may, for example, comprise a layer of polymeric material and may be used to protect one or more portions of the adaptive support element 109. For example, the backing layer 135 may be used to protect one or more electrical connections of the adaptive support element 109. The adaptive support element 109 may also comprise a position sensor 141 configured to determine the amount of curvature of the adaptive support element 109. In FIG. 2, the position sensor 141 is configured to engage a rear face 143 of the carbon fiber layer 129, however, the position sensor 141 may have any appropriate configuration. For example, the position sensor 141 may be integrated into the carbon fiber layer 129 during its manufacture, for example by over molding the position sensor 141 when a polymeric resin is added to the carbon fiber material to form the carbon fiber layer 129.

In the arrangement shown in FIG. 2, the thermal barrier 137 is provided against the front face 133 of the carbon fiber layer 129, such that it is located in between the carbon fiber layer 129 and the exterior padding layer 139. In this manner, the thermal barrier 137 is located between the first heating element 131 and an occupant of the vehicle furniture 103 when using the vehicle furniture 103. However, the thermal barrier 137 may be provided at any appropriate portion of the carbon fiber layer 129 to mitigate the transfer of thermal energy to a passenger or any other adjacent structure. In use, the exterior padding layer 139 defines a support surface for a vehicle occupant at the exterior surface 146 thereof.

The thermal barrier 137 may be any appropriate type of barrier that reduces the transfer of thermal energy from a portion of the adaptive support element 109. For example, the thermal barrier 137 may be a barrier configured to reduce the transfer of energy by thermal radiation, conduction and/or convection. In FIG. 2, it is contemplated that the thermal barrier 137 comprises a reflective insulator configured to minimize the transfer of thermal energy from the first heating element 131 to the environment surrounding the adaptive support element 109. This is advantageous as it reduces the amount by which the environment surrounding the adaptive support element 109 is heated as a result of the operation of the first heating element 131 when heating the carbon fiber layer 129 to effect a curvature change of the vehicle furniture 103. For example, the thermal barrier 137 may help to prevent the first heating element 131 acting to heat an occupant of the vehicle furniture 103, an item placed on the vehicle furniture 103 and/or one or more other components of the adaptive support element 109.

The thermal barrier 137 may be configured to reflect the thermal energy released from the first heating element towards the carbon fiber layer 129. For example, the thermal barrier shown in FIG. 2 may include a reflective insulator configured to redirect thermal energy released from the first heating element 131 back towards the carbon fiber layer 129. In this manner, the efficiency of the first heating element 131 is increased as the thermal barrier 137 reduces the amount of heat lost to the surrounding environment. This is beneficial as it may cause the carbon fiber layer 129 to become malleable and change in curvature at a faster rate and/or by a greater amount compared to an arrangement without the thermal barrier 137.

The thermal barrier 137 may be configured to reduce the transfer of thermal energy from the environment surrounding the adaptive support element 109 to the carbon fiber layer 129. For example, where the vehicle furniture 103 is occupied by a passenger, the thermal barrier 137 may be configured to reduce the amount of thermal energy from the passenger's body that is transferred to the carbon fiber layer 129. In this manner, the thermal barrier 137 can help prevent an inadvertent change in curvature of the carbon fiber layer 129 as a result of an occupant of the vehicle furniture 103 heating the carbon fiber layer 129.

The adaptive support element 109 may comprise a second heating element 145 configured to heat the vehicle furniture 103 and, as a result, an occupant of the furniture 103. For example, the second heating element 145 may be the heating element of a heated seat for a vehicle. Where the adaptive support element 109 comprises the second heating element 145, the thermal barrier may be configured to mitigate the transfer of thermal energy from the second heating element 145 to the carbon fiber layer 129. For example, the thermal barrier 137 may be configured to reduce the amount of thermal energy from the second heating element 145 that is transferred to the carbon fiber layer 129 when the second heating element 145 is active (or has recently been active). In this manner, the thermal barrier 137 can help prevent an inadvertent change in curvature of the carbon fiber layer 129 as a result of thermal energy released from the second heating element 145. In FIG. 2, the second heating element 145 is shown disposed adjacent to an exterior support surface 146 of the padding layer 139.

In another arrangement, the thermal barrier may be a surface treatment, for example a thermal barrier coating, that is applied to one or more portions of the adaptive support element 109. For example, the surface treatment may be applied to one or more portions of the carbon fiber layer 129, such as a surface of the carbon fiber layer 129 to which the first heating element 131 has already been applied. Alternatively or additionally, the surface treatment may be applied directly to the first heating element 131.

The adaptive support element 109 may comprise one or more pressure sensors configured to determine the pressure distribution along the adaptive support element 109, for example when a passenger is seated on the vehicle furniture 103. The adaptive support element 109 may comprise a controller that is configured to adjust the curvature of one or more of the adaptive support elements 109 in response to a signal from the pressure sensor. In this manner, the present disclosure provides a feedback method to adjust the curvature of the vehicle furniture 103 automatically depending on the pressure distribution along the adaptive support element. Such a method may be advantageous in providing improved support to a body portion of an occupant, for example improved lumbar support to the driver 111 of the vehicle 100 when seated.

FIG. 3 shows a cross sectional view of the front seat 105 and a side view of the driver 111 of the vehicle 100 when seated in the front seat 105, as shown in FIG. 1A. FIG. 3 also shows a lumbar support region 147 of the front seat 105 at a seatback portion 115 thereof, which has a radius of curvature R and a distance D from the lower portion 121 of the front seat 105. It is understood that the radius of curvature R and the distance D will be different values depending on the physical characteristics of the driver 111. For example, a lumbar support region 147 for a small person will be positioned closer to the lower portion 121 of the front seat 105 and will have a smaller radius of curvature R, when compared to a larger person. As a result, it is desirable to be able to adjust the position D and the curvature R of the lumbar support region 147.

In FIG. 3, each of the adaptive support elements 109A are arranged adjacent to one another. For example, where the vehicle furniture 103 is the rear seat 107 as shown in FIGS. 1A to 1C, the adaptive support elements 109C are arranged laterally across the rear seat 107, extending in an uninterrupted row along the depth of the lower portion 121 (FIG. 3) of the seat 107 and along the height of the seatback portion 115 (FIG. 3) of the seat 107. In this manner, the adaptive support elements 109 are arranged such that the form of the vehicle furniture 103 is changeable across the full extent of its usable surface. However, in other arrangements, the adaptive support elements 109 may be provided in one or more discrete regions of the vehicle furniture 103. For example, where the vehicle furniture 103 comprises a bed, the adaptive support elements 103 may be provided in head-support region of the bed so that the occupant of the bed is able to set a desired support profile.

In other arrangements, at least one intermediate element 110 may be provided in between two adjacent adaptive support elements 109 B, as shown in the lower portion 121. The intermediate element 110 may be configured to follow, for example passively adapt to, the form of the adaptive support elements 109 which it is adjacent to. For example, the vehicle furniture 103 may be configured, such that the adaptive support elements 109B and the intermediate elements 110 are arranged in an alternating manner.

In the arrangement shown in FIG. 3, each of the adaptive support elements 109 are independently changeable in curvature along their longitudinal axis A-A. In other words, a first adaptive support element 109A may have a different curvature along its longitudinal axis A-A compared to a second adaptive support element 109B. As a result, the overall curvature and form of the vehicle furniture 103 may be determined by the curvatures of respective adaptive support elements 109. For example, the radius of curvature R of the lumbar region 147 may be adjusted within a range of approximately 180 to 300 mm depending on the physical characteristics of the driver 111. The distance D of the center of the radius of curvature from the lower portion 121 may be adjusted in a corresponding manner.

The width of a supporting surface of the adaptive support element 109, for example in a direction perpendicular to its longitudinal axis A-A, may be selected depending upon the magnitude of the range of curvature to which the vehicle furniture 103 is configured to adapt. For example, where the vehicle furniture 103 is configured to adapt to a curvature range of 180 to 300 mm corresponding to the lumbar support region 147 of a seat, the width of the supporting surface may be approximately 60 mm. In this manner, the vehicle furniture 103 is configured such that the adaptive support elements 109 are arranged to provide the necessary resolution to adapt to the required curvature range, which in this case is determined by data regarding the curvature of the human spine. It is understood, however, that the adaptive support elements 109 may have any appropriate dimension and/or be arranged in any appropriate manner so that they are able to adapt over a required range of curvature. For example, where the vehicle furniture 103 is the headrest 125, the adaptive support elements 109 may have a smaller width, for example 10 mm, so that, when combined with one another, the adaptive support elements 109 are able to provide a higher curvature resolution in a direction perpendicular to the longitudinal axis of each individual adaptive support element 109.

The present disclosure therefore provides an article of vehicle furniture 103 and an associated method of configuring the form of the article of vehicle furniture 103 depending on the physical characteristics of the driver 111 and/or one or more passengers 113. One advantage of the present disclosure is that the article of vehicle furniture 103 need not comprise any mechanical linkages or articulated components in order to adapt the form of the vehicle furniture 103. Indeed, the change in form of the vehicle furniture is brought about by the controlled application of thermal energy to the carbon fiber layer 129 of respective adaptive support elements 109. Furthermore, where the adaptive support elements 109 comprise one or more pressure sensors, the controller may be configured to adjust the curvature of each of the adaptive support elements 109 in order to reposition and/or change the radius of curvature R of the lumbar support region 147 in response to the output from the pressure sensors. However, it is understood that the method may comprise adjusting the curvature and/or form of any appropriate region of the vehicle furniture 103 in addition to or instead of the lumbar region 147.

It will be appreciated by those skilled in the art that although the disclosure has been described by way of example with reference to one or more arrangements, it is not limited to the disclosed arrangements and that alternative arrangements could be constructed without departing from the scope of the invention as defined by the appended claims.

It will be understood by one having ordinary skill in the art that construction of the described invention and other components is not limited to any specific material. Other exemplary embodiments of the invention disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the invention as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present invention. The exemplary structures and processes disclosed herein are for illustrative purposes and are not to be construed as limiting.

It is also to be understood that variations and modifications can be made on the aforementioned structures and methods without departing from the concepts of the present invention, and further it is to be understood that such concepts are intended to be covered by the following claims unless these claims by their language expressly state otherwise.

What is claimed is:

1. An article of vehicle furniture, comprising:
   one or more adaptive support elements, each of the adaptive support elements including a carbon fiber layer disposed in thermal communication with a first heating element, wherein the first heating element is configured to heat the carbon fiber layer to provide a malleable carbon fiber layer that is configurable between a first configuration and a second configuration; and
   one or more intermediate elements coupled to the one or more adaptive support elements, wherein the one or more intermediate elements are configured to follow a shape of the one or more adaptive support elements between first and second configurations.

2. The article of vehicle furniture of claim 1, wherein the one or more adaptive support elements are configured to support a part of a body of a vehicle occupant on an exterior surface thereof.

3. The article of vehicle furniture of claim 1, wherein the one or more adaptive support elements includes at least two adaptive support elements arranged adjacent to one another.

4. The article of vehicle furniture of claim 1, wherein the one or more adaptive support elements include at least two adaptive elements spaced-apart from each other.

5. The article of vehicle furniture of claim 4, wherein the adaptive support elements and the intermediate elements are arranged in an alternating pattern.

6. The article of vehicle furniture of claim 1, wherein the one or more adaptive support elements include a first adaptive element configured to change configuration by a first amount and a second adaptive element configured to change configuration by a second amount, wherein the second amount is different than the first amount.

7. The article of vehicle furniture of claim 1, wherein each of the adaptive support elements comprises a thermal barrier, wherein the first heating element is disposed between the thermal barrier and the carbon fiber layer.

8. The article of vehicle furniture of claim 7, wherein each of the adaptive support elements comprises a padding layer, wherein the thermal barrier is disposed between the first heating element and the padding layer.

9. The article of vehicle furniture of claim 8, including:
a second heating element disposed within the padding layer adjacent an exterior support surface of the padding layer.

10. An article of vehicle furniture, comprising:
a seat portion and seatback portion;
one or more adaptive support elements disposed in each of the seat portion and the seatback portion, each of the adaptive support elements including a carbon fiber layer operable between support and configurable conditions, wherein each of the adaptive support elements further includes a first heating element disposed in thermal communication with the carbon fiber layer, wherein the first heating element heats the carbon fiber layer to the configurable condition, and further wherein each of the adaptive support elements includes an exterior padding layer defining a support surface for supporting a vehicle occupant; and
a second heating element disposed in the exterior padding layer for heating the support surface.

11. The article of vehicle furniture of claim 10, wherein each of the one or more adaptive support elements comprises a thermal barrier, wherein the first heating element is disposed between the thermal barrier and the carbon fiber layer.

12. The article of vehicle furniture of claim 11, wherein each of the one or more adaptive support elements comprises a second thermal barrier, wherein the second thermal barrier is disposed between the second heating element and the carbon fiber layer.

13. The article of vehicle furniture of claim 10, including:
one or more intermediate elements coupled to the one or more adaptive support elements, wherein the one or more intermediate elements are configured to follow a shape of the one or more adaptive support elements when the carbon fiber layers are in the configurable condition.

14. An article of vehicle furniture having one or more adaptive support elements, each of the adaptive support elements comprising:
a carbon fiber layer operable between support and configurable conditions;
a heating element in thermal communication with the carbon fiber layer as coupled directly thereto along a first side of the heating element, wherein the heating element is configured to heat the carbon fiber layer from the support condition to the configurable condition; and
a thermal barrier layer, wherein the thermal barrier layer is coupled directly to a second side of the heating element that is opposed to the first side of the heating element.

15. The article of vehicle furniture of claim 14, wherein the carbon fiber layer includes front and rear faces, wherein the heating element is disposed on one of the front and rear faces of the carbon fiber layer.

16. The article of vehicle furniture of claim 15, including:
a backing layer disposed on the rear face of the carbon fiber layer.

17. The article of vehicle furniture of claim 14, including:
a padding layer disposed adjacent to the thermal barrier layer.

18. The article of vehicle furniture of claim 17, wherein the padding layer includes an outer surface for supporting a vehicle occupant.

* * * * *